INVENTOR.
John R. Maneschi
BY
C. A. Gulbrandsen
Atty.

Aug. 16, 1966 J. R. MANESCHI 3,267,220

MAGNETIC DRUM TRANSLATOR

Filed April 12, 1963 6 Sheets-Sheet 3

Aug. 16, 1966 J. R. MANESCHI 3,267,220

MAGNETIC DRUM TRANSLATOR

Filed April 12, 1963 6 Sheets-Sheet 4

United States Patent Office 3,267,220
Patented August 16, 1966

3,267,220
MAGNETIC DRUM TRANSLATOR
John R. Maneschi, Oak Park, Ill., assignor to Automatic Electric Laboratories, Inc., Northlake, Ill., a corporation of Delaware
Filed Apr. 12, 1963, Ser. No. 272,608
6 Claims. (Cl. 179—18)

The present invention relates to automatic telecommunication exchange systems generally and more particularly to electronic translator arrangements for use in such systems.

The invention is particularly but not exclusively adapted for use in automatic crosspoint telephone switching systems of the type disclosed in the copending application of Ronald E. Schauer, Kenneth E. Prescher, John G. Van Bosse, and Alfred C. Lange, entitled "Register Sender Arrangement for a Communications Switching System," filed March 27, 1963, Serial No. 268,385. It is an improvement over the translator of the copending application of John R. Maneschi, Joseph E. Meschi, Verner K. Rice, John G. Van Bosse, and Lawrence W. Amiot filed March 27, 1963, Serial No. 268,384 directed to a translator using magnetic drum techniques.

The system disclosed in the present application may be considered as a direct improvement on the copending application Serial No. 268,384, filed March 27, 1963 of Maneschi et al. titled Magnetic Drum Translator.

The disclosure of the foregoing patent is hereby made a part of the present application as if fully set forth herein.

The present invention provides additional features and modifications to the previously described translator to render it more reliable, while decreasing the circuit complexity.

In accordance with an object of the present invention a greatly improved and simplified translator is provided.

A feature of this invention is the use of only a single address counter.

Another feature of this invention is the use of a single comparison circuit for both directory number and line number translations.

Another feature of this invention is the use of a memory readout buffer whereby the memory may be read out continuously until coincidence is found.

The above mentioned and other objects and features of this invention and the manner of attaining them will become more apparent, and the invention itself will be best understood, by reference to the following description of an embodiment of the invention taken in conjunction with the accompanying drawings comprising FIGS. 1–7 wherein:

FIGS. 1–3 when arranged in sequence, comprise a block diagram of a telephone switching exchange.

Figures 6, 7:
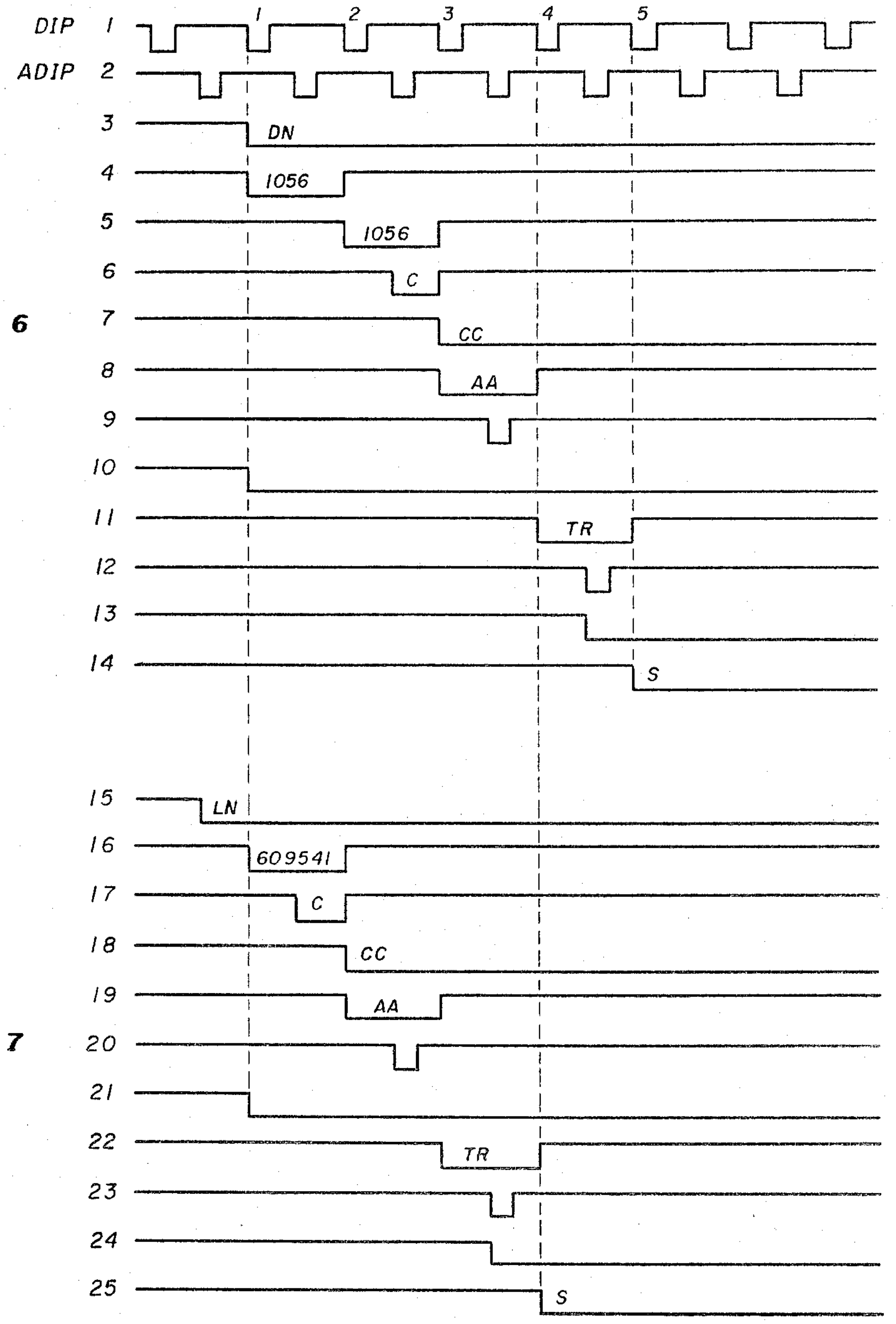

FIGS. 6 and 7 comprise the translator process timing diagram.

GENERAL SYSTEM DESCRIPTION

The system arrangement and the components used are generally similar to those decribed in the following patent applications.

K. K. Spellnes, Communication Switching System, Serial No. 230,887, filed October 16, 1962, now Patent No. 3,170,041. K. K. Spellnes et al., Communication Switching System, Serial No. 240,497, filed November 28, 1962.

K. E. Prescher et al., Communication Switching System Common Control, Serial No. 231,625, filed October 19, 1962, now Patent No. 3,173,994.

E. J. Glenner, Translator, Serial No. 231,627, filed October 19, 1962.

Maneschi, Meschi, and Rice titled Magnetic Drum Translator, Serial No. 268,384, filed March 27, 1963.

*The general trunking diagram*

Figure 1:
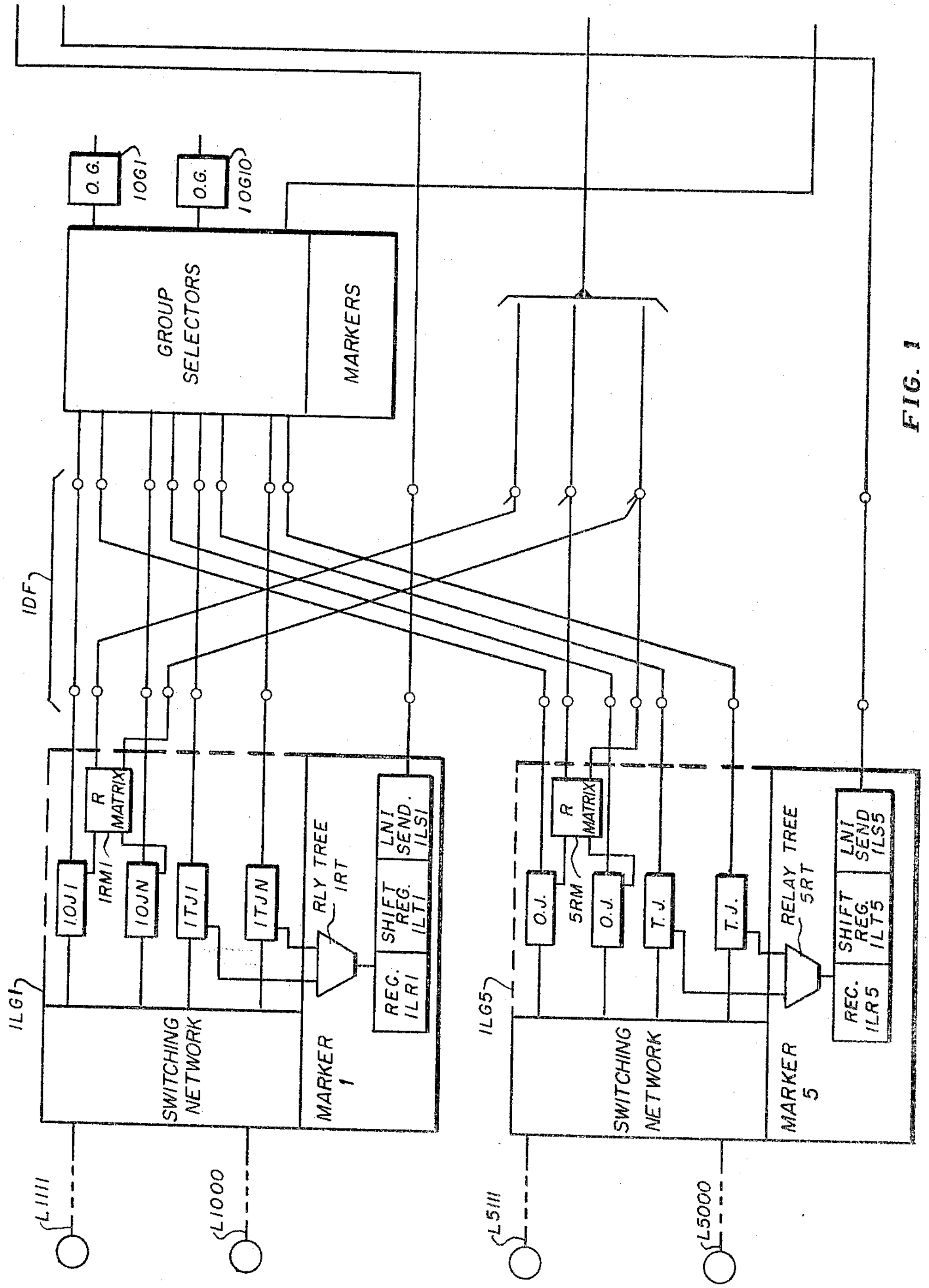
Figure 2:
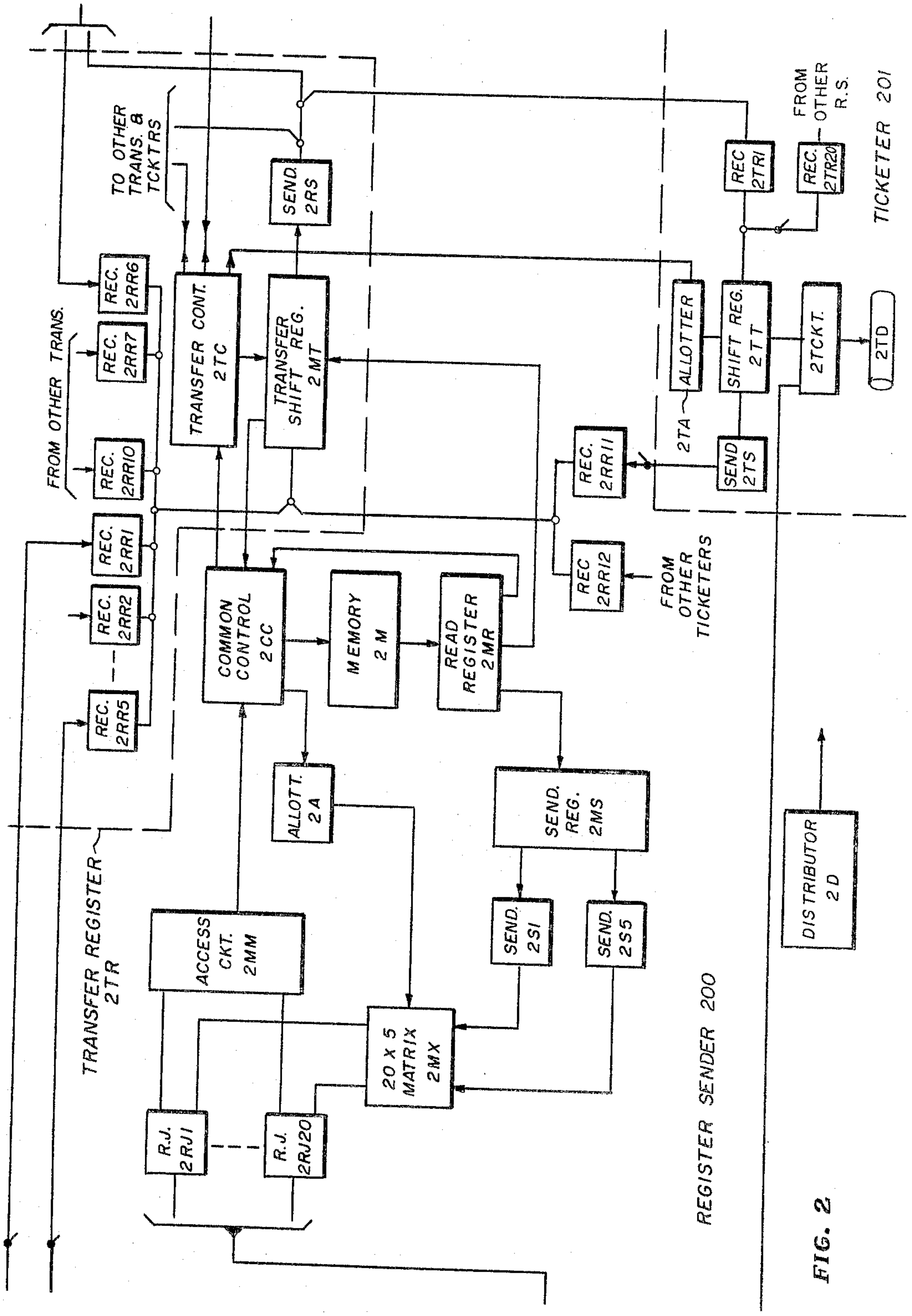
Figure 3:
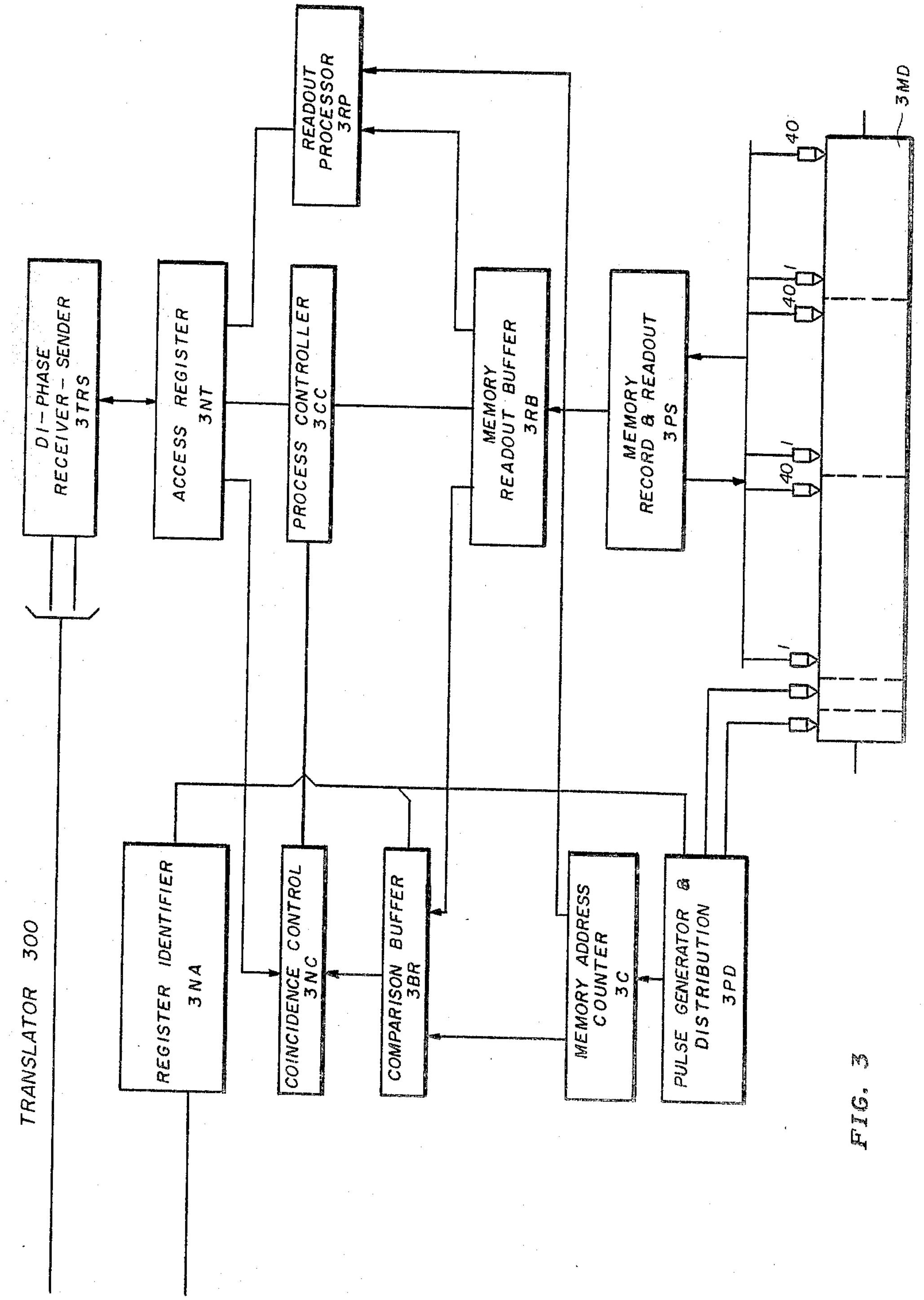

A general trunking block diagram is shown in FIGS. 1, 2 and 3. The system consists of four basic system sections; namely, the line groups 1LG1–1LG5, the group selectors 1GS, the register-sender group 200, and the translator group 300. Each of these sections is self-contained and controlled by its own clock circuitry and operates independently and not in synchronism with any other section. A minimum of two register-sender groups 200 will be equipped per office and the translator 300, including its magnetic drum 3MD and logic circuitry, will always be furnished in pairs per 10,000 directory numbers.

Time division techniques are used in the register-sender group 200 and in the translator 300. The line group and selector markers are designed on an electronic basis and semi-conductor circuitry is employed throughout the system. A ferrite core memory 2M is used for temporary storage in the register-sender group, whereas the magnetic drum 3MD is used for semi-permanent storage. The space division switching elements of the system consist of reed relay matrix assemblies; in which the cross points are made up of reed capsules normally having two windings.

The line groups and group selectors perform the switching by way of reed relay matrix assemblies in cross point configurations; each cross point comprising reed capsules and normally two windings. This means that the connections are made by reed relays and the control of these relays is performed by electronic circuitry. The line groups 1LG1–1LG5 perform two way switching for 1,000 lines and are graded by means of an intermediate distributing frame IDF for connection to register groups and group selectors.

The group selector 1GS provides one way switching from a total of 360 incoming trunks or originating junctors to a total of 1,200 outgoing trunks or terminating junctors. The outlets may be divided into a maximum of 120 levels with a minimum of 10 outlets per level. A group selector is connected to other switching sections by a grading on the IDF.

A register-sender group consists of a maximum of 20 register junctors 2RJ1–2RJ20 and 5 senders 2S1–2S5. The register-sender group 200 is equipped to handle only local originating calls from the local line groups. The 5 senders 2S1–2S5 are equipped to handle all the various kinds of register traffic and are equipped to send dial speed pulsing, MP pulsing and binary code pulsing; the latter being used for intra-office switching.

The register-sender group also makes connections to the translator 300 for translation of the stored dialed digits.

The translator 300 contains permanently stored information for the directory numbers as well as for area and office codes. The magnetic drums are always furnished in duplicate for safety reasons. There is a pair of these translators each including its own drum for each 10,000 directory numbers.

For handling incoming traffic the complete system also includes section not shown herein, namely separate incoming register-sender groups, and an incoming trunk group having a cross point matrix for connecting these incoming trunks to the incoming register-sender group.

The method of signalling between the system groups is accomplished by a technique called diphase. This method employs a phase shift technique for serial sending and receiving of pulses.

*Typical call*

As an introduction to the system operation, a brief description of a typical local call is processed through the system is now presented. The block diagram may be followed for tracing the call.

Assume that the subscriber on line L1111 initiates a call by lifting his handset. The line group marker of group 1LG1 goes into action first by detecting the originating call mark, identifying the calling line, and selecting an idle register junctor within the register-sender group. A path is then temporarily established from the calling telephone to the register junctor via three stages in tandem in the switching network through one of the originating junctors, such as junctor 10J1, and a cross point in the R matrix 1RM1, and the subscriber receives dial tone. The dialed digits are stored temporarily, coded, and the process is continued as these digits are passed to the translator 300, analyzed for type of originating call, and instructions are selected from the drum memory 3MD and returned to the register-sender group 200 to guide further handling of the call. Upon receipt of the remaining digits, the translator 300 returns switching instructions corresponding to the called number as stored in the drum memory 3MD. The instructions are transmitted from the register-sender 200 via one of the senders 2S1–2S5 and the originating junctor 10J1 of the originating line group to the group selector 1GS. In the group selector 1GS, the instructions are analyzed by the marker, an idle terminating junctor in the terminating line group, and a path established to that line group via cross points in tandem in the group selector. The remaining instructions are followed by the line group marker to locate the called line terminals, select and seize a path from the terminating junctor through cross points in tandem to the called line. The terminating junctor establishes ringing, answer supervision, and talking battery for both parties when the call is answered.

Since the system is a common control operation, the markers of the line group and group selector function only to serve the assigned portion of the call processing and are then released to serve other calls. The register-sender 200 and the translator 300 are functioning on a time division basis and therefore are processing several calls simultaneously. The temporary signalling and control paths are released for further service while only the talking paths are held through the switching matrices and junctors in FIG. 1.

TRANSLATORS FUNCTIONS

*General*

The general function of a translator is to perform a logical analysis of the subscriber dialed number to determine the appropriate routing of the call and the proper control features to be provided in extending the telephone connection. The subscriber dialed number, in accordance with a uniform numbering plan, identifies the destination of the call. To obtain the appropriate routing and control information for a destination, the translators of the E–A–X use selected digits of the subscriber dialed number as addressed to look up in an appropriately organized memory storage on the magnetic drum the corresponding routing and control instructions.

The information stored in this organized memory is sub-divided into three general categories. The first category provides routing and control instructions for reaching telephone stations whose directory numbers are taken from the numbering plan for local telephone exchanges. The process of obtaining these instructions from the memory is referred to as "directory number translations." The second category of information provides routing and control instruction for reaching destinations identified by area codes, office codes, special service codes, and access codes. The process of obtaining these instructions is referred to as "code translations." The third category of information storage in the organized memory provides for the subscriber program information storage for special subscriber services.

DIRECTORY NUMBER TRANSLATIONS

The routing instructions obtained by means of a directory number translation consists of a five digit identification of the switching equipment terminal on which the subscriber line is terminated and the party assignment digit of the subscriber station. Additional information obtained is a two digit originating and a one digit terminating class-of-service assignment of the subscriber station.

For purposes of general identification in the common information transfer format, the five digits of the equipment terminal number and the party digit are designated thus C, D, H, T, U, P. The two digit originating class-of-service is designated by KY and the terminating class-of-service for subscriber stations is designated Q.

LINE NUMBER TRANSLATIONS

The translator is in effect reversible in operation and can use the line number (equipment terminal) and party digit of a telephone station as an address to look up the directory number and the class-of-service assigned to this station. This process is referred to as a "line number translation." The line number translation is used to provide "automatic number identification" for billing purposes on chargeable calls. By analysis of the class-of-service digits obtained on a line number, directory number or code translation, the translator allows or denies access to the called destination or to provide or deny special subscriber service features. Typical of the application of the class-of-service analysis to destination access is in the zoning assignments of wide area telephone service (WATS).

CODE TRANSLATIONS

The instructions obtained by means of a code translation may consist of as many as nine digits of routing instructions and seven digits of processing instructions. Of the nine digits of routing instructions, either two or four digits may be required to switch the group selectors (two digits for each stage of selection). The remaining five digits provide, when necessary, code conversion of the subscriber dialed number, or one to five digits may be substituted for part or all of the dialed numbers. The five prefix digits can be sub-divided into a two digit and three digit grouping to provide different code conversions on alternate routing of the call. Typical of the information contained in the seven processing digits is: the total number of digits the subscriber will dial; how many subscriber dialed digits are to be deleted, from the register storage; whether or not additional translation is required; what information is to be returned for translation; the address of the translator to be used, the method of signalling when extending a call to another office; the pattern to be followed in skipping digits for code conversion; the digit at which the sender is to end its sending; and whether or not charges are to be determined on the call.

For purposes of general identification in the common information transfer format, the four group selector routing digits are designated AB and CD. The five code conversion digits are designated H, T, U, P and Q. The terminating class-of-service digit for code designations are designated by W. The seven processing digits are designated:

AD—Address Digit
IN—Instruction Digit
DE—Delete Digit
SK—Skip Digit
MD—Mode Digit
ES—End of Send Digit
TL—Total Digit In addition to providing the three and six digit code translation capabilities required of a control switching point in DDD, the translators provide for tandem routing of extended area service networks serving both common control and direct control offices under the DDD numbering plan. The translators can generally, in conjunction with the class-of-service assignment of the incoming trunk, determine the necessary routing instructions even though one or two digits of the office code of the dialed number are used up in switching a direct control office from which the call may have originated. The ability to provide direct and tandem routing instructions for abbreviated dialing patterns is general in application and is used in providing other features such as repertory calling, home extension intercom and central exchange service.

SUBSCRIBER PROGRAM CONTROL

The third category of storage in the organized memory is the subscriber programable information. When provided with repertory calling service, the subscriber by dialing directly from his telephone may enter into the memory of the translator only a two digit code to reach an often called telephone station. The subscriber may at any time enter new telephone numbers and codes in his repertoire (90 number maximum) or re-assign new telephone numbers to previously used codes. To guard against unauthorized modification of repertory entries, an individually assigned non-listed six digit number is dialed by the subscriber in addition to the desired repertory entry. This individual identification number is compared with the automatic identification of the telephone station from which the call is originating to verify authorization to make the entry into the translator memory.

In a similar manner an authorized subscriber may dial an entry into the memory which instructs the translator that all subsequent calls dialed to the telephone station from which the entry is being made are to be routed to another telephone station. For instance, a business man when leaving his office may, if he desires, cause incoming calls dialed to his office telephone to terminate instead at his home, his club, or at any other telephone where he may be reached. The translator when performing a directory number translation is instructed, by the processing digits obtained, whether or not a call transfer situation exists and therefore whether reference should be made to the subscriber programmed information to obtain routing to a different destination. More than one telephone number can be assigned to the same telephone for instance a listed and non-listed number. The subscriber may make a transfer entry causing calls to the listed number to be transferred but calls to the non-listed number will not be transferred.

A subscriber may also program the memory to deny calls placed from his telephone access to all extra charge destinations, such as long distance calls, until such time as the subscriber removes the access denial instructions from the translator memory. Entry into the memory to remove the access denial instructions can only be made by dialing the exact six digit non-listed subscribed identification code of this subscriber station.

The subscriber program feathers are inherently dependent upon an electrically programmed memory. The ease, speed, and simplicity of electrical alternability can also be advantageously applied in the initial programming and day-to-day modifications required in the mass information storage for directory number and code translations.

(a) *Memory layout*

The magnetic drum which constitutes the translator memory is 8″ long and 10″ in diameter, and rotates at 1800 r.p.m. Its storage capacity is well above the nominal requirements (12,000 40 bit words) and the average time required for information retrieval is only 16⅔ milliseconds (half a drum revolution) assuming sufficient capacity for handling the expected traffic.

Figure 4:
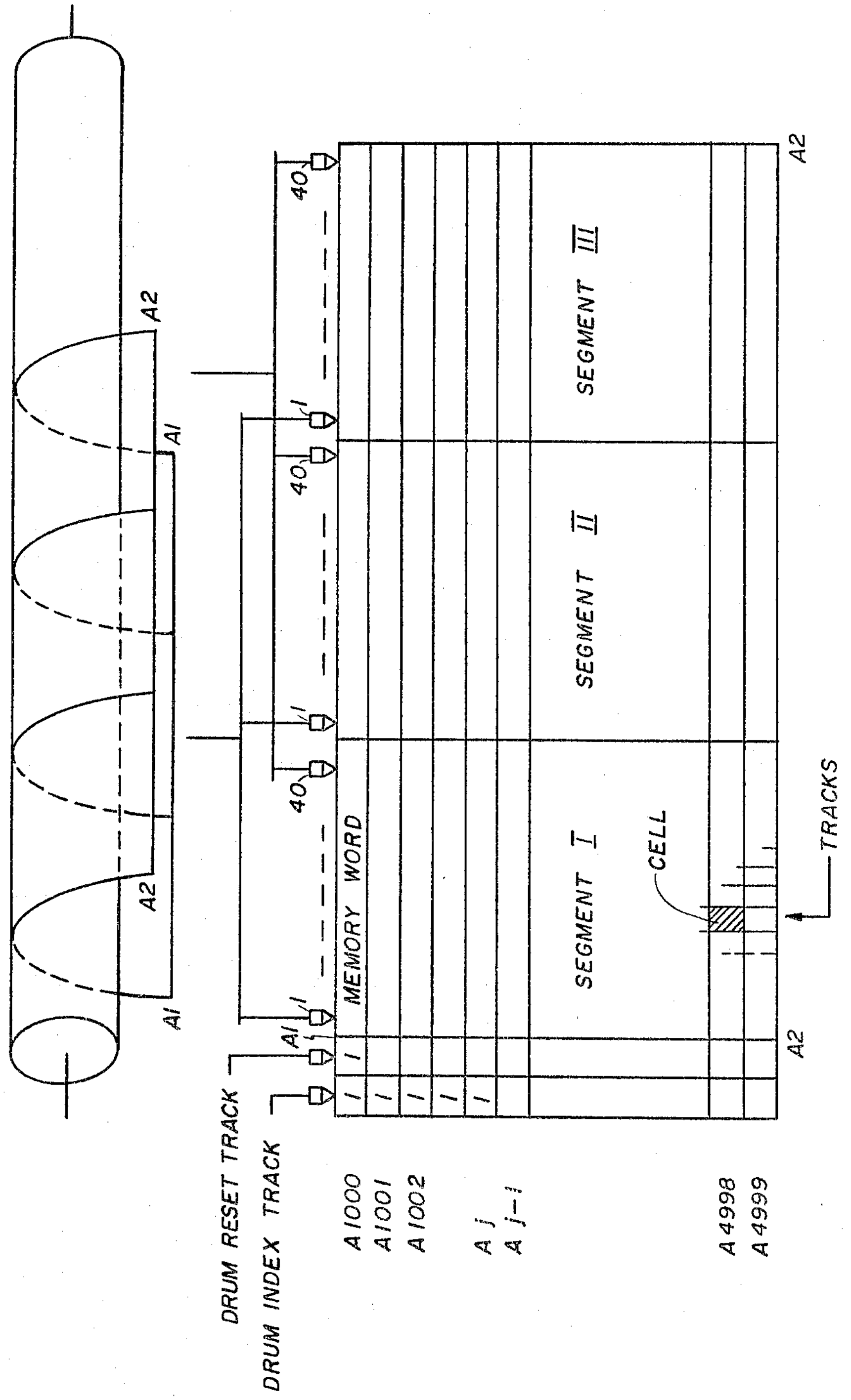
FIG. 4 shows the information layout of the magnetic drum surface.

Parallel layout of the recording on the drum see FIG. 4 is used. This has the advantage that a whole word may be read out at one time, but for simultaneous parallel readout, it requires complete implementation of all tracks, of the word length.

An upper limit is imposed upon the circumferential bit-packing density along a track by the geometry of head design and head-to-drum spacing, as well as by timing considerations. In order not to exceed a packing density of 130 bits/inch, the memory words are divided into 3 segments as shown. On each track are recorded 4,016 bits, each defining a cell on the drum surface. The resultant time interval between successive words is 8.13 microseconds. Basic timing for the translator is provided, via amplifiers, by two tracks on the drum. One of these, the drum index track, holds 4,000 bits, each bit defining the cell locations of three longitudinally adjacent words in each of the three segments; the other track, the drum reset track, holds only one bit, defining revolution time.

Each word location is denoted by an address, numbered from 1000 to 12,999. The addresses of all words in segment I are numbered 1000 to 4000; the same addresses, increased by 4,000, denote all segment II locations; the same addresses increased by 8,000, denote all segment III locations. The read/write heads are arrayed in a straight line along one side of the drum; in practice, to permit close packing of tracks, heads are staggered spirally around the drum, but this does not affect the validity of the present discussion, because time correspondence is maintained between the 120 bits shown to be longitudinally adjacent.

With binary coded decimals it is possible to represent addresses 1000 through 12,999 by 16 bits of information. To uniquely identify each location the 16 bits could be recorded longitudinally adjacent to their corresponding memory words, effectively increasing the size of each word to 56 bits. To economize on drum storage space, however, it is convenient not to record addresses, but to use an electronic counter stepped by the drum index pulses, that cycles through all addresses. During any particular time interval, an address is contained in the counter whose corresponding memory word is passing under the read/write magnetic heads of the appropriate segment.

Read/write amplifiers are provided in the memory record and readout circuit, on the basis of one amplifier for three magnetic heads. Through the use of segment selection switches, only one head out of the three can be enabled to read or record information at any one time.

The timing is to arranged as to assure, during a translation, the simultaneous appearance say, at time $t_j$ of an address $A_j$ in the counter, and the corresponding memory word $C(A_j)$ in the readout register. This process is continuous in the initial stage of a translation; thus new addresses and their memory words succeed each other in the counter and register at 8.13 μsec. intervals. In the description that follows, it is important to realize that most transfers, or comparisons of information, within the translator take place in parallel (all bits simultaneously), whereas input data and output information are serially shifted.

(b) *Memory access and information flow*

There are three different ways of selecting information from the translator:

(1) *Direct address scan*

The input data fed into the transceiver consists of the address $A_d$ of the required memory word. With reference to FIGURE 3, each address $A_j$ appearing in the memory address counter 3C at time $t_j$ is transferred at time $t_{j+1}$ to the comparison buffer 3BR. Here the input data is compared, through the coincidence control 3NC, with address $A_j$ in the comparison buffer. In the same $t_{j+1}$ time interval, memory word $C(A_j)$ is fed into the readout transfer buffer 3RB. Also, at the same time, address $A_{j+1}$ and corresponding memory word $C(A_{j+1})$ appear in the counter 3C and readout buffer circuit 3RB.

All these parallel transfers take place continuously at an 8.13 μsec. rate, until coincidence is detected between the input data address $A_d$ and that address $A_j$ for which $A_d=A_j$. The finding of coincidence inhibits all further transfers, since now the required memory word $C(A_j)$ is available in the readout processor circuit 3RP. The memory word is held there and subsequently fed into the access register 3NT, ready to be shifted out by the receiver-sender 3TRS.

(2) *Memory word scan*

Here, the input data contains information unique to a memory word $C(A_d)$; the requirement is to find its drum address. A consecutive scan over all segments is required, seeking coincidence between input data and the relevant fields of all memory words. The required address is determined by direct correspondence with the memory word that yields coincidence. The operation is analogous to direct address scan, except that the primary information paths are switched as follow: each memory word $C(A_j)$ appearing in the readout buffer circuit 3RB at time $t_j$ is transferred at time $t_{j+1}$ to the comparison buffer 3BR, for comparison with the input data. In the same $t_{j+1}$ time interval, address $A_j$ is fed from the counter 3C into the readout processor 3RP. All transfers stop when coincidence is found, since at this time $C(A_j)=C(A_d)$ and the desired address $A_j$ is available in the readout processor circuit 3RP. The address is thence fed into the access register 3NT, ready to be shifted out.

(3) *Associative address scan*

The two basic approaches to information extraction are: in (1) the address is known and the corresponding memory word is required, and in (2) the memory word is known and the corresponding address is required. In the third approach a portion of a memory word is available and another word in some related position is required. The concept of "address" in (1) and (2) above must now be redefined.

Some memory word words, besides having an external counter address, also have an internal address; this may consist of one or more digits, and denotes a uniquely related memory word. Since such internal addresses are of variable length and may not occur in any order, it is not practical to represent them on a counter; they are therefore recorded on the drum as if they were memory words. The input data in the access register 3NT contains the internal address; the comparison process takes place in a similar manner to (2) above, the "relevant" fields of the memory words being compared with the internal address, until coincidence is found. At this time, the comparison process is halted. If, now, the internal address is in memory word $C(A_j)$, the desired memory word is $C(A_{j+k})$. If K=1, the desired memory word is in the readout buffer circuit 3RB, at time $t_{j+1}$. The desired memory word is then fed via the readout processor 3RP to the access register 3NT, ready to be shifted out. During this whole operation, the counter addresses are not used at all.

It should be noted that, although the memory word in associative address scan is uniquely denoted by its internal address, both the memory word and the internal address possess an external address denoting their physical drum location. Such external address is used when initially recording internal addresses and memory words on the drum.

(c) *Writing operation*

Information flow for a writing operation closely resembles that of direct address scan and uses existing registers. A control console is provided, through which an operator may "key in" each address and the corresponding memory word. The center has access to the translator in such a way as not to interfere with any translation in progress, and not to cause a complete translator shut-down during the operation. The memory word is held in a section of the access register that provides direct connection to the drum write amplifiers in the memory record and readout circuit 3PS.

As in direct address scan, a comparison process takes place between the address in the access register and the counter addresses in the comparison buffer 3BR. When coincidence is detected, the command to write is given.

Given 40-bit words on each segment, it is only necessary to use 40 drum write amplifiers, head switching being employed, as outlined earlier, to select which of the three segments is to be operated upon.

(d) *Selection of recording techniques*

Figure 5:
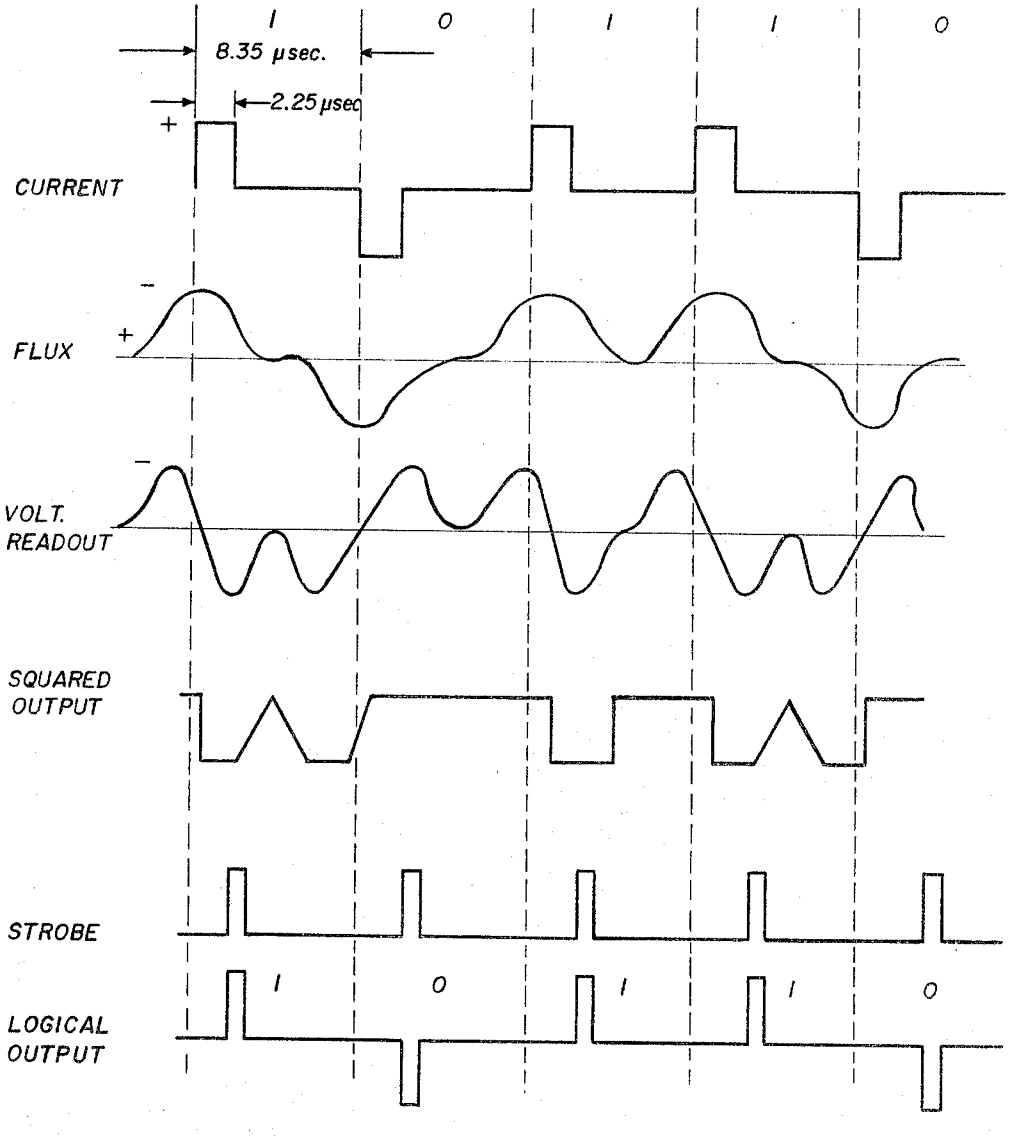
FIG. 5 shows the pulse forms encountered in the dipole method of recording on the drum.

There are a number of recording techniques in common use. The limitations imposed by the circuits used, the desired cell time interval and the need for selective alteration of individual words in parallel makes the RZ (Return-to-Zero) or dipole method, FIGURE 5 appear the most desirable.

In this method of recording a "1" is recorded by a positive current pulse and a "0" by a negative current pulse on a magnetically neutral background; the pulse duration is made equal to 2.25 μsec., as explained in Section (e). Positive and negative current will record positive and negative magnetic flux, respectively, on the drum surface. The voltage readout waveform for each recorded bit is roughly sinusoidal, with the sinusoid for a "0" being 180° out of phase with respect to the sinusoid for a "1." Hence, detection consists in sampling the early part of each time interval with a narrow strobe pulse and determining whether the voltage readout is positive or negative. Assuming that the effective recording field is limited to that portion of the drum surface directly opposite the head gap, typically 0.0010", it can be shown that a 2.25 μsec. current duration corresponds to a gap movement along the drum surface of $v \times t = 942$ in./sec. $\times 2.25$ μsec.=0.0021". At a packing density of 130 bit/inch, each cell is 0.0077" long and carries a magnetization length of 0.0021+0.0010"=0.0031", or 40% of the cell.

(e) *Design considerations for drum access circuitry*

The magnetic head, consists of a soft iron core carrying a center-tapped winding and having a 0.001" gap in close proximity to the magnetic drum surface. Writing occurs by passing current through one or the other half of the winding, causing a flux to flow through the magnetic circuit that consists of the soft iron core and the drum surface opposite the air gap. The magnetic fluxes may flow in either direction, as explained in Section (d), depending on whether the bit to be recorded is a "1" or a "0." Reading is accomplished by amplifying the voltage induced across the whole winding by the changing recorded flux fields passing under the head. The inductance of the winding must therefore be a compromise between a high value to increase readback and a low value to keep current rise time short during writing.

It is also desirable that the write current reach its full steady-state value before being shut off, in order to avoid the irregularities of peak current due to the spread in the time constants of the various combinations of magnetic heads and write amplifiers.

For a nominal value of 72μh., some typical calculations are given. At a steady-state current of 100 ma., required for effective saturation of the magnetic coating, the center tap is held at +16 v. and the desired leg of the winding is connected to a −8 v. source through a 240-ohm resistor. A potential difference of 24 v. is thus effectively used for writing. The time constant $$\tau = L/R \text{ becomes } \frac{72 \times 10^{-6}}{240} = 0.3\ \mu \text{ sec.}$$

$3\tau = 0.9$ μsec. i.e., it takes approximately one microsecond to reach steady state. To allow for the above-mentioned time-constant spread, the write pulse duration between 10% points is satisfactory at 2.25 microseconds.

Due to close coupling of the head windings, it is found that resistor and/or diode paths for the discharge of the energy built up in one leg inductance during conduction result in induced currents circulating in the other leg, with undesirable flux-opposing consequences. Also, at the end of the write pulse, the current in the selected leg decays at a much slower rate if a low-impedance discharge path is provided, causing flux "smearing" into the adjacent cell. For these reasons discharge paths are avoided, at the expense of an inductive voltage spike appearing at the collector of the transistors at turn-off. A second transistor is therefore connected in series with the first, in such a way that under worst case conditions, the value of voltage across both transistors at turn-off does not exceed the sum of their $V_{CEX}$ ratings. For further protection a Zener diode with suitable breakdown voltage is connected between the collector of the second transistor and the +16 v. source. One of the series transistors provides the timing pulse during writing, while the other one is used for all logical selection functions.

To save on drum access equipment, head-switching techniques are employed; the half-windings of the heads that are to share the amplifier are provided with series diodes in the direction of current flow, the diode cathodes being commoned at the terminals of the write amplifier. Selection is accomplished by switching a +16 v. source to the center tap of the desired head, leaving the other center taps open-circuited. The diodes prevent unwanted currents from flowing in the unselected heads.

The input to the drum read amplifier consists of a differential amplifier, both head windings feeding through resistors to the bases of two transistors arranged in a long-tailed pair. The playback amplitude into a 5K load is approximately 45 mv. peak to peak: these variations are superimposed on a D.-C. level of +16 v. from the center tap. This requires that the −16 v. source used, be as free from noise as possible; hence, power for the read-write equipment is supplied through a separate voltage regulator which does not supply the other logic circuits of the system.

The differential amplifier provides some amount of common-mode rejection, and one of the collectors is directly coupled to a second class A amplifier stage. D.-C. and A.-C. feedback are provided to the amplifier stages, to stabilize the operating point and the gain. Direct coupling is provided, up to an overdriven class A stage that squares the output, to permit rapid recovery by the sensing stage after a write operation.

The squaring stage provides 4 μsec. logic level, in the first or second portion of each time interval (depending on whether the information being read out is a "1" or a "0." The squared output and its inverse are strobed in the early part of the time interval, thus providing a narrow pulse on one of two output leads. This pulse provides the A.-C. input to a flip-flop thereby providing a self resetting register called the readout buffer.

(f) *Generation and distribution of pulses*

As shown in FIGURE 3, pulses are derived from the drum index track, at approximately an 8.13 μsec. rate and from the drum reset track, once per revolution. All timing of translator operations (with the exception of serial shifting into and out of the access register is based on these tracks; thus small variations in drum speed do not throw the system out of synchronism. A system of lumped-parameter delay lines and shaping circuits is employed to generate all auxiliary pulses. Logic operations require an auxiliary drum-index pulse at half-time interval; this is produced by feeding the drum index pulse through a 4 μsec. delay line.

Particular care is necessary in the shaping, delaying, and distribution of the write and strobe pulses. The duration of the write pulse is subject to stringent tolerances; the lower limit is imposed by the rise time of the current, as explained earlier, and the upper limit by the "smearing" of flux into adjacent cells. The strobe pulse has to be as narrow as possible, compatible with available circuit elements, and yet must contain sufficient energy to set flip-flops in the readout buffer. The requirement for a narrow pulse is imposed by the need to strobe inside the 4 μsec. interval; a width of approximately 0.70 μsec. has been found to be satisfactory.

Various investigators have examined the effect of differing combinations of recorded "ones" and "zeros" on either side of a cell, under conditions of pulse crowding. (Ref: A. S. Hoagland and G. C. Bacon, "High Density Digital Magnetic Recording Techniques," Proc. IRE, January 1961, pp. 258–267.) Experimentation is required to determine the worst-case pattern for such adjacent pulses, for correct strobing of "ones" and "zeros." As a result of these experiments, stringent tolerances are placed on the positioning of the leading edge of the strobe pulse in the time cell. To maintain strict time-correspondence between the readout of memory words in the readout buffer circuit 3RB and the corresponding addresses in the memory address counter 3C, the leading edges of the strobe pulse and the drum index pulse are made to coincide. The correct delay between strobe and write pulse can then be maintained by anticipating the write pulse; this is achieved by actually deriving the write pulse from the drum index track, and delaying and shaping by varying amounts to derive the main and auxiliary drum index pulses and the strobe pulses.

The distribution of main and auxiliary drum index pulses is carried out through a fan-out of cascaded pulse amplifiers. However, because the cumulative propagation delays through the cascade, tend to stretch each pulse and delay the leading edge, such a distribution scheme is not suitable for write and strobe pulses with parallel operation. With parallel operation it may be necessary to apply strobe or write pulses to as many as 40 drum read or write circuits simultaneously. Therefore special gated pulse drivers are employed to deliver the required high instantaneous currents to all the amplifiers simultaneously, and maintain the tolerances on the pulse durations. Switching is performed by complementary n-p-n and p-n-p transistors in series between −8 v. and ground, so that rise and fall time are both determined by one of the transistors which is driven hard into conduction.

Duration of the write and strobe pulses is determined by the first half-swing of an underdamped resonant circuit controlling the base of a transistor. Such a gated pulse-shaper can be strapped on the outside of the terminals; to yield the desired half-period or other time duration of the pulse, different capacitors and an inductor with several externally available taps are provided.

TRANSLATIONS WITH THE MAGNETIC DRUM

*Method of translator operations*

The function of the translator is to provide the register-sender group with information on the instruction required in handling any request for service. Communication between the register-sender group and the translator consists of high speed serial data transmission and direct signalling used in accessing the translator. One translator is capable of rendering service to 20 register-sender groups; however, only one group can be handled at a time. Besides the 20 register-senders groups, the translator may be accessed by the control console which is used to program and record the permanent memory and perform testing and routing of the translator.

*Translator modes of operation*

To achieve maximum efficiency in the operations of the translator, the translating process is divided into several modes of operation. In each mode, the translator process controller 3CC supervise the sequence of operations assigned to that mode.

If there is no request for service the translator is in the idle mode. In this mode the process controller resets all registers, buffers and other flip-flops to their idle state. The controller also enables the register identifier 3NA to scan all request for service input levels. The scanner is driven by pulses derived from the index readout at the rate of four index pulses (32 μs.) per request of service input level. During this time if request of service is detected the controller 3CC sets the translator into the receive mode.

During this mode, the register identifier 3NA selects the register sender requesting service, and closes a path connecting the two conductor transmission highway. After a guard period of 4 ms. the register identifier 3NA sends the ready to receive command to the respective register-sender group allowing it to start sending data. The translator receiver 3TRS decodes the data into logic levels and stores it in the access register 3NT.

When the process controller 3CC senses that the complete set of data is received, it stops the transmission and sets the translator into the Incoming Data Processing Mode.

In this mode, upon analysis of the received information, the process controller 3CC selects the required type of translation, the object of which is to obtain information from the permanent memory storage or to generate such information by logic commands.

In order to extract information from the memory the controller 3CC selects the required memory segment and enables its readout. It selects a proper pattern of coincidence, initiates the required coincidence scanning and starts the necessary information flow. This mode of operation will continue until a coincidence between the received data and information fed into the address comparison circuit 3NC is acknowledged.

The coincidence command transfers the translator into the Outgoing Data Processing Mode.

If the outgoing information is to be generated by logic commands, the process controller sets the translator into the Outgoing Data Processing Mode directly without the check for coincidence.

The outgoing data generated or read from the memory is stored in the readout processor transfer buffer 3RP.

The information extracted and the information received are now analyzed. Since the point of origin and the destination are now known the routing of the call is checked. If required, the routing may be changed or the call may be blocked if the destination is not authorized. A subsequent reference to the memory and check for coincidence using the originating and terminating class of service as the address may be necessary to determine the proper handling of some calls. Upon completion of the analysis the received data in the access register 3NT is replaced by the outgoing data. The translator now is in the Sending Mode of operation.

Since the data transmission highway remained connected during the translating process, the receiver-sender 3TRS is able to start sending immediately. When the controller 3CC senses that all the data has been sent it sets the translator back to the Idle Mode of operation. The translator is now able to answer the next request for service.

*Accessing the translator*

There are a variety of services for which the register-sender group may access the translator. The translator must be able to recognize and return the required information for all possible combinations of access codes, special service codes, area codes, office codes, directory number, line number, etc. In addition, the translator must inform and guide the register sender if erroneous or incomplete information has been dialed.

In processing a call for service the translator may request the register-sender to access it more than one time. In each new access, the register-sender group has to wait its turn for service and the fact that it is a successive access may only be deducted by the controller 3CC from the analysis of the received data. Thus each call for service is initally viewed by the translator as a first call. The translations required in the second or higher access are considered to be pre-programmed translations, since the processing information which was sent to the register-sender group by the translator in the previous access is returned. The process controller 3CC used this information in sequencing the operation of the translator.

The first access translation is the initial contact between the register-sender group requesting service and the translator. The data sent to the translator may consist of 0, 1, 2, 3 or 4 dialed digits and information pertaining to the point of origin. Since the register-sender group does not analyze the dialed digits, the translation must yield a complete information and instruction required for completion of a given call.

The serial flow of information between the register-sender and the translator consists of 64 data bits (16 digits in binary coded decimal form). Each information transfer to and from the translator is parity checked with one parity bit added to the complete serial data transfer.

Since in the first access, the dialed digits received by the translator are not stored in a fixed position in the 64 bit shift register, the controller 3CC must locate the digits and if necessary establish their values in order to initiate a translation. The outgoing data, resulting from a translation, is sent to the register-sender in specially assigned positions. The outgoing data may be divided into three groups:

(a) Routing instruction
(b) Sender instruction
(c) Processing instruction

The routing instruction, consisting of a miximum of 9 digits, represents information required to route a given call to its destination.

The sender instruction, consisting of a maximum of 3 digits, is information necessary for controlling the various modes of sending used by the register-sender group extending the telephone connection.

The processing instruction, consisting of a maximum of 4 digits, consists of the process control digits required for communication between the translator and the register sender group. With the processing instruction the translator informs the register sender how many digits the subscriber is expected to dial and how many digits should be sent to the translator in each (in a multi-drum office the address of the translator to be accessed is also given). The processing instruction also enables the translator to pre-program its operations for the second or higher access. The translator sends to the register sender the processing digits which are to be returned to the translator in the successive access, instructing the process controller to initiate the required translations.

*Data extraction process*

The object of any type of translation is to obtain data from the permanent memory storage or to extract it from logic commands. For many translations the combination of both methods is used to obtain the required data.

*Logic generated translation*

The logic generation of outgoing data provides the translator with the maximum speed of translation. In logic generated translation, the memory access time (average of 16 ms.) is not required since the process controller sets the translator from the Receive Mode into the Outgoing Data Processing Mode. Logic generated translations do not provide the translator with the source degree of flexibility in programming changes as provided by the completely flexible memory readout translations.

Logic generation of information is used in dealing with incomplete or incorrect data or in the case when a call should be blocked, intercepted or transferred to a special trunk. For all logic generated translations, the required information to be generated is permanent and does not require variation.

The command for a logic generated translation is given by the process controller 3CC upon analysis of the received data. The process controller 3CC allows the translator to omit the Incoming Data Processing Mode and sets the translator into the Outgoing Data Processing Mode. The readout processor 3RP senses the command for logic translation and sets the appropriate D.C. levels in its transfer buffer circuit. During the Outgoing Data Processing Mode of operation these levels are stored in the readout processor buffer 3RP in terms of digits.

The information is transferred to the sender 3TRS and sent to the respective register-sender.

*Memory readout translation*

Translation based on extracted information from an electrically alterable permanent memory storage provides the translator with maximum flexibility To extract information from the permanent memory which is organized in the three segments, the controller 3CC initiates a continuous readout from the selected segment or a consecutive readout of all the segments.

Most of the code translations are located in the third segment of the memory; therefore the process controller 3CC starts with the readout of the third segment automatically proceeding to the second and first segment. In line number translations, since most of the numbers are located in the first and second segment, the controller begins with the readout of the first segment, and then proceeds with the second and third segment. In directory number translations, the controller selects for readout the segment in which the information is stored.

The information read from the storage is transferred to the readout buffer 3RB, and then from there depending on the direct address scan, memory word scan, or associative address scan the proper flow of information is initiated by the controller 3CC.

To select the required outgoing data from the stored information the translator seeks coincidence between the input data and the information fed into coincidence buffer 3BR. Since the input data used in finding coincidence does not appear in the same position for each call; the process controller 3CC (upon establishing the location) energizes only some coincidence gates. The address comparator 3NC is equipped with 24 coincidence gates, each gate is capable of finding a coincidence between two digits (four bits per digit) located in a fixed position one in the comparison buffer 3BR the other in the access register 3NT. For instance, a gate G1 of 3NC checks the concidence between digit position C1 in the coincidence buffer 3BR and digit position T1 in the access register 3NT. Another coincidence gate G2 checks the position C1 with position T2 in the access register. The number of coincidence gates used in a given translation varies from two to ten. Gates not used are inhibited by the process controller circuit 3CC. The coincidence gates used and the various positions compared, give the translator definite coincidence patterns (which must be followed in order to extract the desired information from the memory). The simultaneous coincidence of all energized coincidence gates used in a given translation indicates an overall coincidence which is acknowledged by the comparator circuit 3NC.

In associative memory scan the information fed into the comparator 3NC consists of the memory words constituting only internal memory addresses of various length, as well as memory words containing outgoing data.

There could exist a possibility of finding enormous coincidence with such outgoing data. Moreover, some internal address consisting of few digits could coincide with a fraction of a longer address yielding also an erroneous coincidence.

To guard against such errors all calls for service are classified in various groups with each of these relevant fields there is associated a definite coincidence pattern. Also for each relevant field the process control 3CC generates a coincidence control digit. Such a digit is originally recorded with every internal address. During memory scan the overall coincidence cannot be found unless the control digits correspond.

Similar control digits are originally recorded with the words representing outgoing data. Upon coincidence, the control digits are used to enable the data transfer from the readout buffer to the readout processor. Since the positions of every digit in the outgoing data is fixed the control digits are used to guide the transfer of data to their assigned locations. For instance if a memory word control digit is E1 the data digit in position R1 of the readout buffer transfers to position T1 in the transfer buffer, however, if the control digit is E2, position R1 transfers to position T3. The variable loading patterns provide very efficient use of the permanent memory storage position.

When the overall coincidence is acknowledged by the comparator the comparison process is halted. The internal memory address is now in the coincidence buffer 3BR. Once coincidence has been found all memory words readout after this internal address are checked by the process controller 3CC for the presence of a loading control digit. When the control digit is sensed, an immediate command for data transfer to the processor 3RP is given. This feature of programming the data readout after coincidence, permits the translator to save memory space, since repetitious data memory words are not recorded. To take advantage of this feature, all internal addresses having the same data words are grouped and placed in consecutive manner in the memory storage which are followed by the data word pertaining to this group.

Some translations may require as many as 64 bits of outgoing data, a single memory word contains 40 bits, therefore the translator uses a folded memory word. Such folded words consist of two or more single memory words placed consecutively in the memory storage. Each of these single memory words contains a loading pattern control digit permitting the proper readout transfer.

All the operations performed by the translator are grouped in certain types of translations. Each type uses, separate coincidence pattern, and distinct procedure in the data processing mode of operation.

TYPES OF TRANSLATION

All types of translations are grouped with respect to their order of access into three general categories:

(a) First access code translation
(b) Higher access code translation
(c) Number group translations

*First access code translations*

The outgoing data required for the first access translations may be read from the memory or generated by logic. Some of the typical memory readout type of translations performed on the first access are considered below:

FIXED MEMORY READOUT TRANSLATION

To translate a code which cannot be readily checked for coincidence when the outgoing data is not assignable to allow logic generated translation, then the process controller performs a special readout translation without the use of coincidence.

The controller 3CC selects a desired segment and enables the memory readout 3PS. The control digit assigned to each memory is now analyzed by the controller 3CC. This procedure continues until the appearance of a predetermined data control digit is sensed in the readout buffer 3RB. The decoded value of the digit, with this type of translation, gives a command to transfer the information in the readout buffer 3RB to the processor circuit 3CC. The translator is now set into the Outgoing Data Processing Mode followed by the Sending Mode where the extracted data is sent to the register sender being served.

THREE DIGIT CODE TRANSLATION

Since many access codes, special service codes, and all area and office codes consist of three digits the translator, prior to the regular translation, performs a pre-translation. The pre-translation consists of code veri-constitutes an assigned code which should be translated fication which is confirmation if a given three digit code constitutes an assigned code which should be translated or if it is an unauthorized code which must be intercepted. The pre-translation is also used to determine which area or office codes are not reached with a common routing (final route). The translator can be programmed, to use the pre-translation process, in establishing zoning assignment in the wide area telephone service and in metering service. The merit of pre-translation lays in the ability to check thousands of codes without storing them in the permanent memory.

In the pre-translation process the memory address counter 3C is used as the code identifier. During each thousand (TH) count the hundred (H) the ten (T) and the unit (U) digits change from 000 to 999 displaying all possible three digit codes. In every memory word there is a bit allocated to this type of translation which marks a three digit code represented by the H, T, U.

The decoded value of the thousand digit classified the category of the marked code. Under the first thousands digit, the category is code verification, the second thousand is assigned to all final route area codes, office codes, and so on. There are four possible categories per one drum revolution, the third to all final routes. With one bit assigned in the memory word.

During the pre-translation process the drum address counter output is fed into the comparator 3NC which seeks coincidence between the H, T and U of the counter and three digit code stored in the access register 3NT. The memory readout 3PS is also enabled and the pre-translation marking bit checked in every readout. The controller 3CC decodes the thousands digit and sets an appropriate command if the three digit coincidence is found and the pre-translation marking bit is sensed. If this occurs during the first thousand the controller 3CC gives the command to intercept the call since the input data represents an unassigned code.

If this occurs during the second or third thousand count the command to route this call via area or office final route is given.

If no coincidence was found in the pre-translation process the normall code translation begins using the associative memory scan. The controller 3CC generates the coincidence control digit which together with the three digit code is compared with the internal addresses read from the memory. Upon coincidence, when the loading control digit is sensed in the readout buffer 3RB, the outgoing data is transferred, with its appropriate loading pattern, into the readout processor 3RP.

CODE AND CLASS OF SERVICE TRANSLATIONS

The translator must furnish routing data for special service codes which require different routing instructions for the same code, depending upon the point of origin. To translate such codes the controller 3CC includes the point of origin identification called the class of service (KY) as well as the code digits (11N) in the coincidence pattern. Upon coincidence the data is extracted through an associative address scan.

REPERTORY DIALING AND CALL FORWARDING TRANSLATIONS

The routing data for these translation is stored in the segment of the memory called the subscriber programmed memory. The register-sender group accesses the translator with an abbreviated code and the subscriber station line identification both of which are included in the coincidence pattern. The controller 3CC, upon establishing the type of translation required, selects the required segment and initiates the associative address scan which enables the translator to extract the subscriber programmed data from the memory storage.

There are other types of translations performed in the first access. Each type requires different patterns of coincidence, however, all first access translations obtain the necessary data by logic generation or through associative address scanning.

CLASS OF SERVICE TRANSLATION

In some translations the required information can be easily extracted from the memory readout by including the point of origin identification into the coincidence pattern. These translations include home extension intercom, local and toll incoming junctor (from the SXS) and other calls for service.

The translator process controller 3CC selects this type of translation upon analysis of the incoming data. The information is extracted from the memory through an associative address scan.

HIGHER ACCESS CODE TRANSLATIONS

The second or higher access translations are considered to be pre-programmed translation, since the processing digit sent to the register-sender group in the first access are returned to the translator and now enable the controller to select the desired translation.

The translator requests a second access translation in cases where the received information in the first access was not sufficient to determine the complete routing data. Second access code translations use the associative address scan in order to extract the data from the memory.

The most typical second access translation is the six digit area and office code translation. In the first access, the data consisted of the area code which in many cases is not sufficient to determine complete routing data. In such a case, during the first access code translation, the register-sender group is requested to access the translator the second time. From the analysis of the processing information the controller 3CC recognizes the second access translation, and includes the received six digits into the coincidence pattern. Upon coincidence the translator proceeds as in the first access translation.

NUMBER GROUP TRANSLATION

Number group translations provide routing and control instructions for reaching telephone subscribers whose directory numbers are assigned to the local telephone exchange. The number group translations may be divided into the directory number translations and the line number translations.

DIRECTORY NUMBER TRANSLATION

The object of this translation is to extract from the memory, information which will route the call to the local subscriber station.

Like the second or higher access code translation, it is a pre-programmed translation. The received data may consist of seven dialed digits, the first three being the office code, the last four represent the thousand (TH) the hundred (H) and the ten (T) and the unit (U) digit of the dialed directory number; however, in cases of lost digits (in switching a call through a SXS office) the received data may consist of 4 or 3 dialed digits representing the TH, H, T, U or the H, T, U of the dialed directory number. (In the last case one of the class of service digit is substituted as the missing thousands digit.)

Since the number of digits received varies the TH, H, T and U digit of the received directory number used in finding coincidence is stored in differing positions, each different position of the TH, H, T and U requires separate coincidence patterns for the translation process. The TH, H, T, and the U digits of directory number are represented by the address counter. To every step of the counter from 1000 to 10,999 there is a memory word assigned representing the corresponding line number.

The directory number translation is initiated by the controller upon analysis of the processing information. Selection of the desired drum segment that contains the required data, is based on the value of the thousand digit of the received directory number. To extract data from the memory storage to controller 3CC initiates the direct adress scan during which the counter 3C is being fed into the comparator circuit 3NC and checked for coincidence with the TH, H, T, and U digit of the received directory number from the access register 3NT, at the same time the corresponding line number read from the selected segment is being transferred to the readout processor 3RP. Upon coincidence the memory readout transfer is halted since the line number corresponding to the given count for which coincidence was found is now in the readout processor 3RP.

The data extracted from the drum is not complete, but since the addition of information is the same for most directory number translations the logic generation of processing digits and sender instruction digits, is performed in the Outgoing Data Processing Mode. When the completed data is obtained the controller transfers the translator into the Sending Mode. The use of the memory word control digit is important in cases where the coincidence is found with the address counter 3C representing an unassigned directory number or a number for which a special processing is desired. In such instances, upon decoding the value of the control digit the command for intercept or for special handling of the call is given by the process controller 3CC.

*Translator process timing*

The timing for the translator in the process state is illustrated in FIGURES 6 and 7. The timing for the two modes (DNT and LNT) is shown for a typical example (address 1056). The auxiliary timing commands are the principal factors in determining the translator timing.

The legends for each line of FIGURES 6 and 7 are as follows:

(1) Drum index pulses (DIP).
(2) Auxiliary drum index pulses (ADIP).

DNT (3) Control indicating a directory number translation (DNT).
(4) Address locations (directory numbers) counted in the drum counter.
(5) Buffer register 3BR during DNT.
(6) Coincidence (C) for directory number 1056 during DNT.
(7) CC set for coincidence with directory number 1056 during DNT.
(8) AA set for coincidence with directory number 1056 during DNT.
(9) 3NC reset for transfer.
(10) Information transfer into buffer register 3BR.
(11) TR set for coincidence with directory number 1056 during DNT.
(12) Transfer pulse.
(13) Information in access register.
(14) Translator access register send during DNT.

LNT

(15) Control indicating a line number translation (LNT).
(16) 3RB during LNT.
(17) Coincidence C for drum information (line number) corresponding to directory number 1056 during (LNT).
(18) CC set for coincidence with line number corresponding to directory number 1056 during (LNT).
(19) AA set for coincidence with line number corresponding to directory number 1056 during LNT.
(20) 3NC reset for transfer.
(21) Information in buffer register 3RB.
(22) TR set for coincidence with line number corresponding to directory number 1056 during LNT.
(23) Transfer pulse.
(24) Information translator access register during LNT.
(25) Translator access register send during LNT.

Referring to FIGS. 6 and 7, with directory number "1056" in the access register 3NT and the drum address counter 3C also at the time it counts "1056," the number is transferred into the comparison buffer 3BR one time interval later. The coincidence mark "C" and the stored coincidence "CC" are produced in the same manner as disclosed in the copending application Serial No. 268,384. The function $C+CC=C'$, is produced in the coincidence control circuit 3NC, and is used to inhibit information transfers. Time step AA is taken as before, to allow gating out of the access register 3NT reset pulse. Since drum readout is now continuous the readout pulses as disclosed in the above mentioned application Serial No. 268,384 are no longer required. The time step TR can be taken starting with the DIP pulse as shown, rather than with an ADIP. Thus anticipating by half a time interval the transfer of outgoing information from the readout processor 3RP to the access register 3NT.

LINE NUMBER TRANSLATION

The object of this translation is to obtain the directory number (and the true class of service) of the subscriber station for a known line number identification and party assignment.

This translation is basically the opposite of the directory number translation. Like the directory number translation it is also considered to be of a pre-programmed translation. Since the received data, representing the line numbers is stored in the same position in each translation there is only one pattern of coincidence required. The necessary information is partially represented by the address counter (TH, H, T, U). The rest of the required data is extracted from the memory (class of service) and generated by logic (office code).

To perform this translation the controller, upon decoding the processing digits, enables a consecutive memory segment readout, starting with the first segment, and uses the memory word scan. The memory words representing the line number are fed into the coincidence buffer 3BR while the corresponding address counter 3C representing the TH, H, T, U of the required directory number and the class of service read from the memory is transferred to the readout processor 3RP. The required office code and the processing instruction is logically generated during the Outgoing Data Processing Mode. In a multi-drum office each drum has to be scanned in turn for coincidence. To access the next drum the register-sender group has to be informed that coincidence was not found. For such translations the data is logically generated and sent to the rigister-sender after all segments of the memory containing line numbers were scanned for coincidence.

CONTROL AND UTILIZATION OF A DUPLICATE TRANSLATOR

Translators are provided in duplicate. During normal operation the 20 register-sender groups are shared between a translator and its duplicate each serving ten. However, if a translator is malfunctioning the controller transfers its inputs to the duplicate translator which then handles the entire traffic load. The faulty translator remains in the exact state in which the malfunction occurred. This decreases the work of the control center in detecting the cause of the malfunction. If a situation occurs that one translator is out of service and the duplicate translator also develops a fault condition, the controller 3CC inhibits the duplicate translator from transferring its input load.

*Translator malfunctions*

Each access to the translator is timed for each translation and mode of operation is also timed for its completion. Counting of the number of drum revolutions (33 ms. per revolution) allows the translator to set a time table according to which all operations are timed. An operation of the translator not completed within the specified time is considered a malfunction for which the controller sets the translator out of operation and transfers its input loads to the duplicate translator.

The operation of the counter is checked during translation as well as during the idle mode. Upon completion of one revolution of the drum, if the decoded value of the counter is incorrect (4096), the controller stored the fact that a miscount occurred and proceeds to check the count in the next revolution.

The counter has a self-checking and self-correcting feature, therefore, only two consecutive failures of the counter are considered a malfunction for which the input loads of the translator are transferred.

The received data is checked for completeness and correct parity; however, the reception of erroneous data for the first time is not considered to be a translator malfunction since there is a possibility that the register-sender group involved in sending the data could be at fault. In the next access the translator will probably deal with different register-senders (since up to 20 registers are served). If incompleted data or incorrect parity is received again it is considered to be a translator malfunction for which the controller transfers the input loads to the amplifier.

What is claimed is:

1. An automatic telephone system including register-senders, a common translator, and a translator allotter, said translator comprising: a first plurality of incoming register means operated upon receipt of a plurality of digits to register said digits, a record means having recorded therein a plurality of sets of coded call routing and control data items, readout means adapted to read said recorded data from said record means, counter means arranged to indicate the address of said record means corresponding to said readout means, coincidence detecting means, first buffer register means, second buffer register means, counter gating means, process control means, last-digit gating means operated after receipt of the last one of said plurality of digits to pass said last digit to said process control means, first decoding means in said process control means operated upon receipt of said last digit to enable said counter gating means to pass said counter count to said first buffer register means and simultaneously enable said readout means, first circuit means comprising the connection of said second buffer register means and said readout means, said second buffer register means operated via said first circuit means by said readout means to register said record data in synchronism with said counter count presented to said coincidence means, circuit means comprising the connections of said first buffer register means and said incoming register means to said coincidence means, said coincidence means thereby operated to compare said data from said incoming register and said counter count, coincidence signal means in said coincidence means operated upon parity between said two sets of data to signal said process control means, control means in said process control means operated responsive to said signal to disenable said readout means and operate said buffer register to transfer said appropriate coded call routing and control data items from said second buffer register to said incoming register, other means thereafter operated to send said coded call routing and control data from said incoming register to said register-sender.

2. Apparatus according to claim 1 in which said record means is a constantly revolving magnetic drum, each set of said recorded items are recorded in a plurality of four bit code items in an axial row along the surface of said drum, and each of said sets of said recorded items is recorded in sequence in a circumferential row, said drum including 4000 of said axial rows in said circumferential row.

3. An automatic telephone system including register-senders, a common translator, and a translator allotter, said translator comprising: a first plurality of incoming register means operated upon receipt of a plurality of digits to register said digits, a record means having recorded therein a plurality of sets of coded call routing and control data items, readout means adapted to read said recorded data from said record means, counter means arranged to indicate the address of said record means corresponding to said readout means, coincidence detecting means, first buffer register means, second buffer register means, counter gating means, process control means, last-digit gating means operated after receipt of the last one of said plurality of digits to pass said last digit to said process control means, first decoding means in said process control means operated upon receipt of said last digit to enable said counter gating means to pass said counter count to said first buffer register means and simultaneously enable said readout means, first circuit means comprising the connection of said second buffer register means and said readout means, said second buffer register means operated via said first circuit means by said readout means to register said record data in synchronism with said counter count presented to said coincidence means, second circuit means comprising the connections of said first buffer register means and said incoming register means to said coincidence means, said coincidence means thereby operated to compare said data from said incoming register and said first buffer register, coincidence signal means in said coincidence means operated upon parity between said two sets of data to signal said process control means, control means in said process control means operated responsive to said signal to disable said readout means and operate said second buffer register to transfer said appropriate coded call routing and control data items from said second buffer register to said incoming register, an outgoing sender, sender control means in said process control means operated upon completed transfer of data to said incoming register to connect said outgoing sender to said incoming register, said outgoing sender thereafter operated to send said data from said incoming register to said register-sender.

4. Apparatus according to claim 3 including a third buffer register and said process control means includes second decoding means operated upon receipt of a different last digit to enable said counter gating means to pass said counter count to said third buffer register means and simultaneously enable said readout means, other circuit means comprising the connection of said readout means, and said second buffer register means to said first buffer register means operated to operate said second circuit means, and other control means in said process control means operated responsive to said signal to disable said readout means and operate said third buffer register to transfer its contents to said incoming register.

5. An automatic telephone system including register-senders, a common translator, and a translator allotter, said translator comprising: a first plurality of incoming register means operated upon receipt of a plurality of digits to register said digits, a record means having recorded therein a plurality of sets of coded call routing and control data items, readout means adapted to read said recorded data from said record means, counter means arranged to indicate the address of said record means corresponding to said readout means, coincidence detecting means, first buffer register means, second buffer register means, third buffer register means, counter gating means, process control means, last-digit gating means operated after receipt of the last one of said plurality of digits to pass said last digit to said process control means, first decoding means in said process control means operated upon receipt of said last digit to enable said counter gating means to pass said counter count to said third buffer register means and simultaneously enable said readout means, first circuit means comprising the connection of said readout means and said second buffer register means to said first buffer register means, said first buffer register means operated via said first circuit means by said readout means to register said record data in synchronism with said counter count presented to said third buffer register means, second circuit means comprising the connections of said first buffer register means and said incoming register means to said coincidence means, said coincidence means thereby operated to compare said data from said incoming register and said first buffer register, coincidence signal means in said coincidence means operated upon parity between said two sets of data to signal said process control means, control means in said process control means operated responsive to said signal to disable said readout means and clear said incoming register, said incoming register and said third buffer register thereafter operated to transfer said buffer register contents to said incoming register, an outgoing sender, sender control means in said process control means operated upon completed transfer of data to said incoming register, said outgoing sender thereafter operated to send said data from said incoming register to said register-means.

6. An automatic telephone system including register-senders, a common translator, and a translator allotter, said translator comprising: a first plurality of incoming register means operated upon receipt of a plurality of digits to register said digits, a record means having recorded therein a plurality of sets of coded call routing and control data items, readout means adapted to read said recorded data from said record means, counter means arranged to indicate the address of said record means corresponding to said readout means, coincidence detecting means, first register means, second register means, third register means, counter gating means, process control means, last-digit gating means operated after receipt of the last one of said plurality of digits to pass said last digit to said process control means, said readout means operatively connected to said second register means, first means in said process control means operated upon receipt of said last digit to decode said digit, second means in said process control means operated in response to a first decoded digit to enable said counter gating means to pass said counter count to said first register means simultaneously enable said readout means and operatively connect said second register means to said third register means, third means in said process control means operated in response to a second decoded digit to enable said counter gating means to pass said counter count to said third register means, simultaneously enable said readout means, and operatively connect said second register to said first register, said readout means operatively connected to said second register means, circuit means comprising the connections of said first register means and said incoming register means to said coincidence means, said coincidence means thereby operated to compare said data from said incoming register and said first register, coincidence signal means in said coincidence means operated upon parity between said two sets of data to signal said process control means, control means in said process control means operated responsive to said signal to disable said readout means, said counter gating means and clear said incoming register, said incoming register and said third register thereafter operated to transfer said third register contents to said incoming register, an outgoing sender, sender control means in said process control means operated upon completed transfer of data to said incoming register to connect said outgoing sender to said incoming register, said outgoing sender thereafter operated to send said data from said incoming register to said register-means.

References Cited by the Examiner

UNITED STATES PATENTS 3,055,983 9/1962 Baker ............ 179—18

KATHLEEN H. CLAFFY, *Primary Examiner.*

WILLIAM C. COOPER, *Examiner.*